United States Patent Office 3,756,799
Patented Sept. 4, 1973

3,756,799
METHOD FOR BEAM HEATING OF GLASS
Norbert Neuroth, Mainz-Mombach, Germany, assignor to JENAer Glaswerk Schott & Gen, Mainz, Germany
Filed Oct. 13, 1970, Ser. No. 80,298
Claims priority, application Germany, Nov. 3, 1969,
P 19 55 175.8
Int. Cl. C03b 5/16, 9/00, 23/20
U.S. Cl. 65—18      3 Claims

ABSTRACT OF THE DISCLOSURE

A finely divided substance, such as a glass powder or crystalline powder, is trickled from an elevated position into a horizontally directed and horizontally flattened laser beam having a wave length greater than 2.5 μm., preferably 10.6 μm. The laser beam melts the powder and the molten material is deposited on a slowly downwardly moving base causing the formation of a rod of glass or crystal on said base.

---

Figure 1:
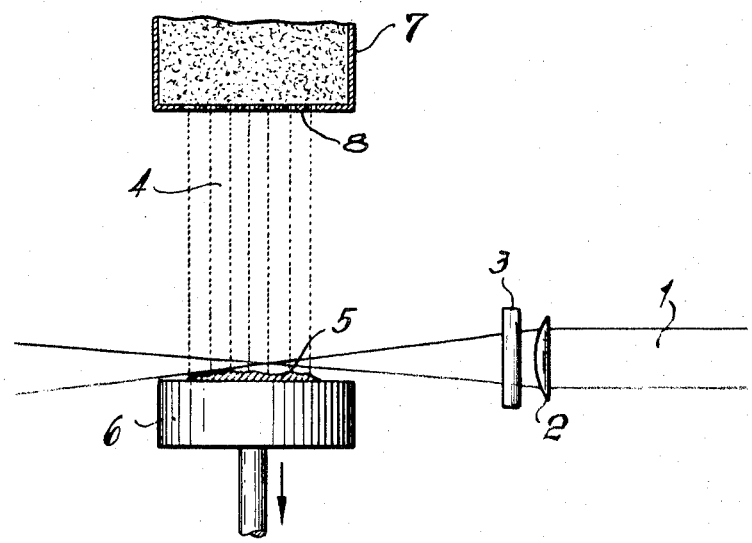

The invention relates to the production of glass and crystalline material from finely divided starting substances with the assistance of a laser device which emits an infrared radiation with a wave length greater than 2.5 μm. The known $CO_2$-gas laser emits, for instance, an infrared radiation having the wave length of 10.6 μm. At this wave length all silicate, borate, phosphate, and fluoride glasses are absorbent and the absorption at 10.6 μm. is particularly strong. In the table attached to this description are indicated the absorption constants $$k = \frac{1}{d} \cdot \ln \frac{1}{\vartheta}$$

wherein $d$=the thickness, and $\vartheta$=the pure transmission degree, while $1/k$=the depth of penetration of the electromagnetic radiation of the wave length 10.6 μm. of the different glasses and glass raw materials. The depth of penetration $1/k$ is the distance from the surface at which the intensity of the radiation has been reduced to $1/e$ of the intensity of the incident ray. One obtains then values of a few μm., i.e. already in an extremely thin layer this radiation is completely absorbed. Since one is able to obtain with a $CO_2$-gas laser an infrared radiation of a 10.6 μm. wave length in a very large capacity (up to 1000 watts), it is possible to heat crystalline materials, glass raw materials, or glass with this radiation source to a molten condition.

The main advantage of this melting method is that the total radiation energy is directly absorbed by the material to be molten and it is not necessary to heat at the same time any crucible material, oven and atmosphere. The exclusive heating operation for the material to be melted makes a crucible dispensible. Accordingly, any impurities which may be caused by the crucible material are eliminated and, furthermore, the melting temperature is not limited by the type of any crucible material.

The drawing illustrates diagrammatically an apparatus which may be used for practicing the method of the present application.

Figure 2:
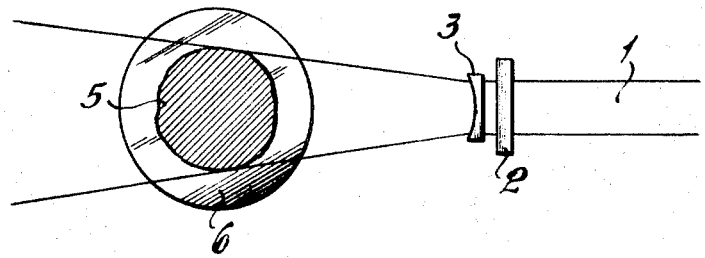

In the drawing:
FIG. 1 illustrates a side elevation view of the device, and
FIG. 2 is a top view of the same.

Referring to the drawing, the laser beam 1 which is emitted by a commercial laser apparatus, for instance by a $CO_2$ laser, has customarily a circular cross-section. At the start of an operation the laser beam is arranged with its axis substantially horizontal. By employing two cylinder lenses which, for instance, are made of NaCl or germanium, the cross-section of the beam is first reduced in the vertical direction and then is widened in the horizontal direction.

A convex cylinder lens 2 which, for instance, has a focal length of 10 to 20 cm., is inserted with the longitudinal axis of its cylindrical surface in horizontal direction into the laser beam 1. This lens 2 reduces the thickness of the laser beam in the vertical plane. A concave cylinder lens 3 is inserted with the longitudinal axis of its cylindrical surface disposed in vertical direction into the laser beam. This last mentioned cylinder lens 3 causes a widening of the laser beam in horizontal direction. In this manner it is possible to obtain a beam which in a region at 5 in the vertical plane is relatively narrow and which in the horizontal plane is relatively wide.

The size of the cross-section of the beam is thus determining for the cross-section of the glassy or crystalline article produced.

Above the location where the glassy or crystalline article is to be produced is arranged a powder container 7 with a perforated bottom 8 so that when placed in this container 7 the mixture 4 to be melted trickles in the form of a fine grained powder into the laser beam and is molten at 5. Directly below the beam and in vertical alignment with the container 7 is disposed a base 6 upon which the molten material is deposited. The base 6 is slowly moved downwardly in coordination with the melting speed achieved by the laser beam.

In accordance with a preferred embodiment of the invention the base 6 may be rotated during its downward movement. The laser device and the optic 2,3 are pivotally mounted so that the angle at which the laser beam strikes material to be molten may be varied as desired in order to maintain the efficiency during the melting operation at an optimum value. In this manner a rod of glass or crystal is produced. In the case that a crystal rod is being produced one may, if desired, draw this rod again, or a plurality of times, through the laser beam so that one is able to exploit the effect of the known zone melting method.

The method of the invention may also be practiced in a vacuum or in a protective gas atmosphere in which the base and the powder container are arranged in a chamber which is evacuated or is filled with a gas and in which the laser beam enters this chamber through a window.

Example

For the production of a rod consisting of quartz glass, one fills the container 7 with the perforated bottom 8 with quartz crystal powder having a grain size of about 60 μm. This powder when discharged through the perforated bottom trickles into the beam of a $CO_2$-gas laser which beam passes through a first convex cylinder lens to be reduced in vertical direction and then passes through a concave cylinder lens in order to be widened in the horizontal direction. This widened laser beam will have in the focal point of the convex lens a width of about 20 mm. In this region the powder thickles through the beam. Directly below this beam is disposed a fireproof base, which in accordance with the melting speed of the powder is moved slowly downwardly.

TABLE

[Absorption constants of glasses and glass raw materials for the wave length 10.6 μm. and depths of penetration of the radiation]

| Materials | Absorption constant K (cm.$^{-1}$) | Depth of penetration 1./K (μm.) |
|---|---|---|
| Flint glass (quartz glass) | 4.8·10$^3$ | 2.1 |
| Sodiumsilicate glass | 3.6·10$^3$ | 2.8 |
| Borate glass | 2.0·10$^3$ | 5.0 |
| Borosilicate glass | 2.3·10$^3$ | 4.3 |
| Phosphate glass | 4.0·10$^3$ | 2.5 |
| Na$_2$CO$_3$ | ca. 2·10$^2$ | 50 |
| CaCO$_3$ | ca. 90 | 110 |
| ZnCO$_3$ | ca.1.0·10$^3$ | 10 |
| Al$_2$O$_3$ | ca. 5·10$^2$ | 20 |
| MgO | ca. 70 | 140 |
| PbCO$_3$ | ca. 1.5·10$^2$ | 67 |

What I claim is:

1. A method of manufacturing glass from a raw material in finely divided condition, comprising the steps of—
   (a) producing a substantially horizontal laser beam of a wavelength in excess of 2.5 μm.;
   (b) inserting in the path of said laser beam an optical assembly including a convex cylinder lens having the axis of its cylindrical surface horizontal and a concave cylinder lens having the axis of its cylindrical surface vertical, thereby causing said laser beam to assume in the focal region of said convex cylinder lens a vertically narrow and horizontally wide cross-section;
   (c) trickling said raw material downwardly through said focal region of the flattened laser beam to cause melting of said raw material onto a support base therebelow; and
   (d) continuously moving said support base downwardly as the molten material accumulates thereon.

2. The method according to claim 1, including the step of using a CO$_2$-gas laser having a wave length of 10.6 μm.

3. The method according to claim 1, including the step of rotating said support base on a substantially vertical axis.

References Cited

UNITED STATES PATENTS

| | | | |
|---|---|---|---|
| 1,992,994 | 3/1935 | Delpech | 65—134 X |
| 3,303,115 | 2/1967 | Nitsche | 65—DIG. 4 |
| 2,852,890 | 9/1958 | Drost et al. | 65—33 X |
| 3,573,887 | 4/1971 | Mod et al. | 65—134 |
| 3,594,259 | 7/1971 | Coen et al. | 65—134 |
| 3,237,254 | 3/1966 | Hanks et al. | 65—DIG. 4 |
| 3,244,412 | 4/1966 | Robinson et al. | 65—DIG. 4 |
| 3,304,403 | 2/1967 | Harper | 65—DIG. 4 |
| 3,415,636 | 12/1968 | Upton | 65—134 |
| 3,452,178 | 6/1969 | Kleen | 65—DIG. 4 |
| 3,528,484 | 9/1970 | Scharf et al. | 65—DIG. 4 |

OTHER REFERENCES

Handbook of Glass Manufacture, vol. II, Foy V. Tooley, pp. 192 to 199, New York, 1961.

FRANK W. MIGA, Primary Examiner

U.S. Cl. X.R.

65—DIG. 4, 33, 66, 134